(12) United States Patent
Hsiao et al.

(10) Patent No.: US 9,442,998 B2
(45) Date of Patent: Sep. 13, 2016

(54) DATA STORAGE METHOD, DATA STORAGE SYSTEM AND REQUESTING NODE USING THE SAME

(71) Applicant: Industrial Technology Research Institute, Hsinchu (TW)

(72) Inventors: Tai-Hua Hsiao, Hsinchu (TW); Yu-Ben Miao, Hsinchu (TW); Yen-Chiu Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 635 days.

(21) Appl. No.: 13/887,379

(22) Filed: May 6, 2013

(65) Prior Publication Data

US 2014/0181234 A1    Jun. 26, 2014

(30) Foreign Application Priority Data

Dec. 24, 2012 (TW) .............................. 101149567 A

(51) Int. Cl.
*G06F 17/30* (2006.01)

(52) U.S. Cl.
CPC .............................. *G06F 17/30578* (2013.01)

(58) Field of Classification Search
CPC .................... G06F 17/30578; G06F 15/17331
USPC ........................................................ 709/213
See application file for complete search history.

(56) References Cited

U.S. PATENT DOCUMENTS

| | | | |
|---|---|---|---|
| 7,526,672 B2 | 4/2009 | Lin et al. | |
| 7,937,482 B1 | 5/2011 | Vermeulen et al. | |
| 7,945,912 B1 | 5/2011 | Nussbaum et al. | |
| 8,127,413 B2 | 3/2012 | Pu et al. | |
| 8,181,180 B1 | 5/2012 | Anderson et al. | |
| 2005/0216798 A1* | 9/2005 | Yu ............................ | G06F 9/526 714/718 |
| 2006/0161516 A1* | 7/2006 | Clarke .............. | G06F 17/30578 |
| 2008/0195759 A1* | 8/2008 | Novik ............... | G06F 17/30174 709/248 |
| 2009/0222825 A1* | 9/2009 | Upadhyaya ............. | G06F 9/524 718/102 |
| 2011/0107301 A1* | 5/2011 | Chan ................... | G06F 17/2288 717/121 |

FOREIGN PATENT DOCUMENTS

| | | |
|---|---|---|
| TW | 200521762 | 7/2005 |
| TW | 200630891 | 9/2006 |
| TW | 200841190 | 10/2008 |

OTHER PUBLICATIONS

Butelle, "A Model for Coherent Distributed Memory for Race Condition Detection." Parallel and Distributed Processing Workshops and Phd Forum (IPDPSW), 2011 IEEE International Symposium, May 2011.*

(Continued)

*Primary Examiner* — Nicholas Taylor
*Assistant Examiner* — Chong G Kim
(74) *Attorney, Agent, or Firm* — Jianq Chyun IP Office

(57) ABSTRACT

The present disclosure provides a data storage method, a data storage system and a requesting node. The data storage method includes the following steps. A register identifier and a register time are written into a target data table. The target data table is read to look for a register time record, such that an access right of the storage node is determined. A requesting node having the access right computes result data, and writes a usage identifier and the result data in the target data table. The target data table is read to judge the validity of the result data.

50 Claims, 10 Drawing Sheets

(56) References Cited

OTHER PUBLICATIONS

"Notice of Allowance of Taiwan Counterpart Application", issued on Oct. 13, 2014, p. 1-p. 4.

Lukáš Hejtmánek, "Distributed Data Storage with Data Versioning," CESNET Conference 2006, Mar. 6-8, 2006, pp. 1-13.

Baker et al., "Megastore: Providing Scalable, Highly Available Storage for Interactive Services," 5th Biennial Conference on Innovative Data Systems Research (CIDR '11), Jan. 9-12, 2011, pp. 223-234.

Butelle et al., "A Model for Coherent Distributed Memory for Race Condition Detection," 2011 IEEE International Parallel & Distributed Processing Symposium, May 16-20, 2011, pp. 584-590.

Evan Philip Charles Jones, "Fault-Tolerant Distributed Transactions for Partitioned OLTP Databases," Dissertation for Ph.D. in Computer Science, Dept. of Electrical Engineering and Computer Science, Massachusetts Institute of Technology, Feb. 2012, pp. 1-112.

Taylor et al., "Reliable Storage and Querying for Collaborative Data Sharing Systems," IEEE 26th International Conference on Data Engineering (ICDE 2010), Mar. 1-6, 2010, pp. 40-51.

Muzahid et al., "SigRace: Signature-Based Data Race Detection," 36th Annual International Symposium on Computer Architecture (ISCA'09), Jun. 20-24, 2009, pp. 337-348.

Randal Chilton Burns, "Data Management in a Distributed File System for Storage Area Networks," Dissertation for Ph.D. in Computer Science, University of California Santa Cruz, Mar. 2000, pp. 1-161.

Silberschatz et al., Operating System Concepts (8th Edition), John Wiley & Sons, Jul. 2008, pp. 262-267.

\* cited by examiner

| Target data table of data X | | | |
|---|---|---|---|
| C1 — Identifier | $U_t$ | $U_v$ | |
| C2 — Data content | $T_u$ | $V_u$ | |

DATA STORAGE METHOD, DATA STORAGE SYSTEM AND REQUESTING NODE USING THE SAME

CROSS-REFERENCE TO RELATED APPLICATION

This application claims the priority benefit of Taiwan application serial no. 101149567, filed on Dec. 24, 2012. The entirety of the above-mentioned patent application is hereby incorporated by reference herein and made a part of this specification.

BACKGROUND

1. Technical Field

The disclosure is related to a data storage method in a distributed system.

2. Related Art

In a distributed system, data accessing is one of the most important tasks to maintain the operation thereof. A position of data accessing is determined according to a formula or mechanism computation of the distributed system so that data may be stored in a node in the distributed system, which is also referred to as a storage node. Any requesting node which has the need to access the data obtains the position for accessing the data by using the same manner so as to update or change the data.

One of the most common architectures of the distributed system is a peer-to-peer (P2P) network architecture, which is considered as the core technology for the network foundation and service. The peer-to-peer session initiation protocol (P2PSIP) working group of the Internet Engineering Task Force (IETF) is proceeding with the development of a protocol standard defining a P2P-based REsource LOcation And Discovery (RELOAD) for standardizing the operations and data storage in the P2P network. However, the RELOAD protocol standard is a P2P signaling protocol to form the overlay network rather than as a database storage protocol. The RELOAD protocol standard features in allowing an application to access data placed in a P2P network through a RELOAD requesting node. Nevertheless, a RELOAD storage node is merely in charge of receiving and responding an access request and incapable of identifying from which application the request is send or whether the data should be locked for a specific application. Hence, the RELOAD may be not able to avoid the problem of race condition.

For instance, FIG. 1 is a schematic diagram illustrating a race condition in a distributed system adopting the RELOAD protocol standard. Referring to FIG. 1, a RELOAD distributed system 100 has a storage node S having a data counter of a "number of views". There are two requesting nodes A and B in the RELOAD distributed system 100. The requesting nodes A and B read an original data counter "100" of the "number of views" simultaneously or with a slight time difference. The requesting node A updates the data counter of the "number of views" as "101" after reading the "number of views". Meanwhile, the requesting node B also updates the data counter of the "number of views" as "101" after reading the "number of views". Namely, the data counter of the "number of views" stored in the storage node S is updated as "101". However, in fact, after being downloaded by the requesting nodes A and B, the correct data counter of the "number of views" should be updated as "102". Such error occurs due to the requesting nodes A and B simultaneously writing the data counter of the "number of views" into the storage node S without avoiding the race condition and separately arranging the actions, which results in data error.

Accordingly, how to avoid the race condition in the distributed system has become a subject. Currently, a centralized coordinator (e.g. a central server) for access allocation in the distributed system is developed, where each requesting node in the distributed system is controlled by the centralized coordinator. Another technique is to establish a server-client architecture in the distributed system to avoid the race condition; however, therein, both the requesting nodes and the storage nodes may need to change operational mechanisms thereof. Still another developed technique is to avoid the race condition by notifying or coordinating among each requesting node in the distributed system, and therein, each requesting node should be aware about all other requesting nodes in the network which are also interested in the same storage node, and then, only one requesting node has access right which is determined by negotiation between requesting nodes.

SUMMARY

Accordingly, the disclosure introduces a data storage method used in a distributed system and a distributed system and a requesting node using the method.

The disclosure introduces a data storage method applicable to a requesting node. The data storage method includes steps as follows. A register identifier and a register time are written into a target data table. The target data table is read to look for a register time record to determine whether an access right to write into a storage node is obtained. After obtaining the access right to compute result data, the requesting node writes a usage identifier and the result data into the target data table. The target data table is read to judge validity of the result data.

The disclosure further introduces a data storage system including a plurality of storage nodes and a plurality of requesting nodes. The storage nodes are configured to include a target data table. Each of the requesting nodes writes its own register identifier and a register time into the target data table. When a current requesting node among the requesting nodes reads the target data table to look for a register time record to determine whether an access right to write into a storage node is obtained, the current requesting node obtaining the access right computes result data, writes its own usage identifier and the result data into the target data table and reads the target data table to confirm validity of the result data.

The disclosure still further introduces a requesting node applicable to a data storage system. The requesting node includes an access right control unit, a computation processing unit and a finalization confirming unit. After writing a register identifier and a register time into the target data table, the access right control unit reads the target data table to look for a register time record to determine whether an access right to write into a storage node is obtained. When the access right control unit determines that the access right is obtained, the computation processing unit computes the result data, and writes the usage identifier and the result data into the target data table. The finalization confirming unit reads the target data table to judge validity of the result data.

To sum up, in the method introduced by the disclosure, whether the requesting node with identifiers obtains the access right of the storage node is examined by writing first and then examining. After the data is updated, whether another register time record of any other user exist between the register time and the result data is examined so as to examine whether the access right is still effective.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 3 is a schematic diagram illustrating the target data table 222 according to an exemplary embodiment of the disclosure.

DETAILED DESCRIPTION OF DISCLOSED EMBODIMENTS

The distributed system of the disclosure is established under the architecture and the communication standard of RELOAD protocol regulated by the IETF P2PSIP Working Group. By using a requesting node having data with an identifier to first write and then examine, whether an access right of a storage node is obtained may be confirmed, and after data update is finished, whether the access right is still valid is confirmed. Such operation does not have to change the operational mechanism of the storage node, but only the operational mechanism of the requesting nodes. Meanwhile, no communication or message exchange is required among each requesting node. In order to make the disclosure more comprehensible, embodiments are described below as examples showing that the disclosure can actually be realized. The embodiments provided herein are for an illustrative purpose, instead of limiting the scope of the disclosure.

Figure 1:
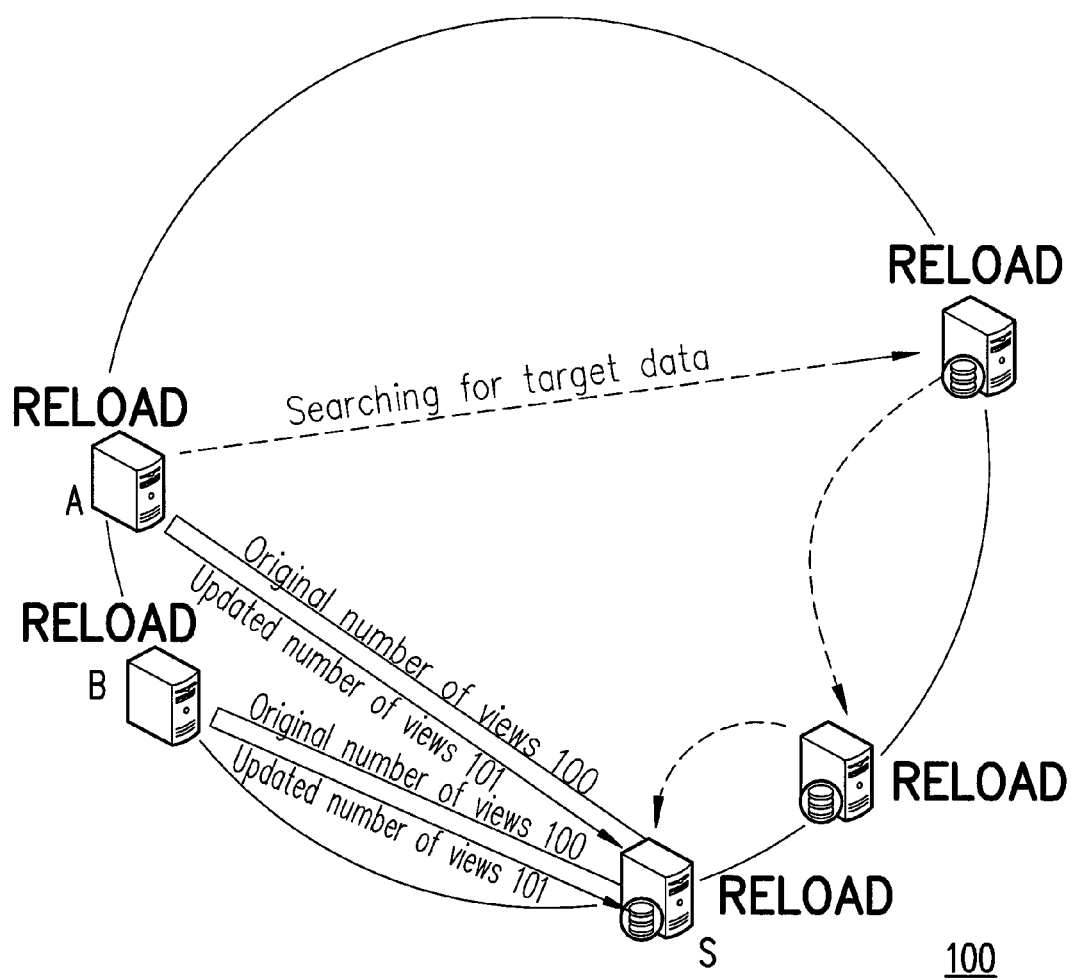
FIG. 1 is a schematic diagram illustrating a race condition in a distributed system adopting a REsource LOcation And Discovery (RELOAD) protocol standard.
Figure 2A:
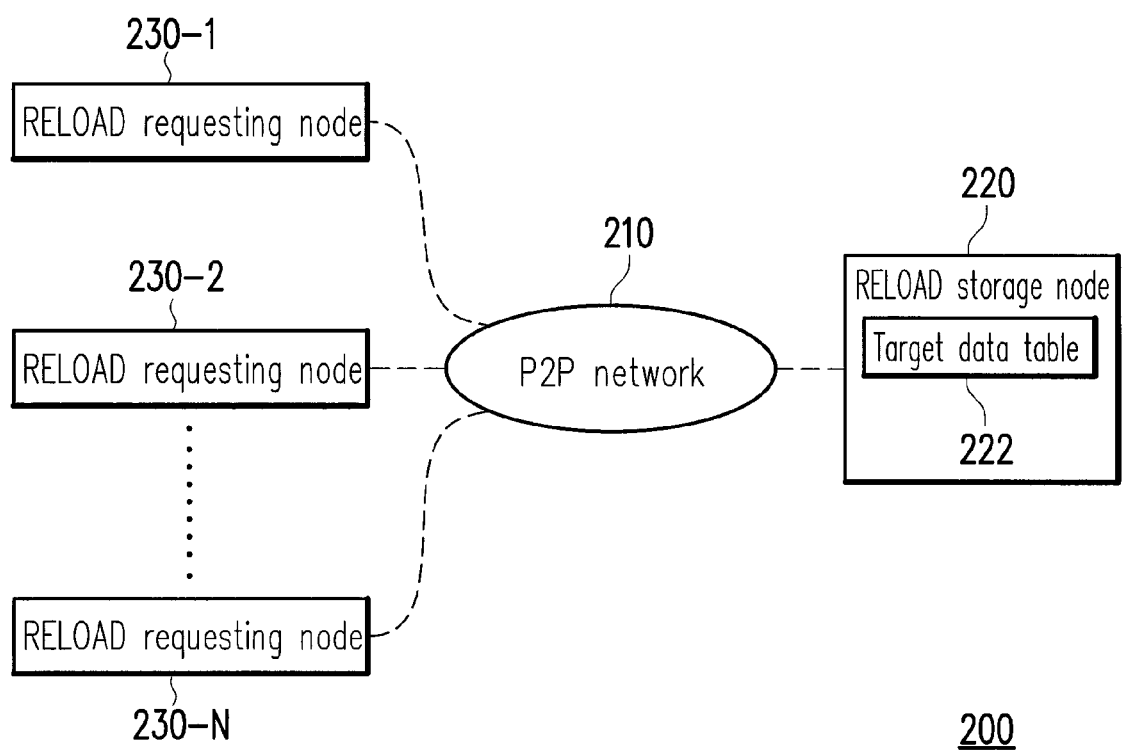
FIG. 2A is a block diagram illustrating a distributed system according to an exemplary embodiment of the disclosure.

FIG. 2A is a block diagram illustrating a distributed system according to an exemplary embodiment of the disclosure. Referring to FIG. 2A, in the present exemplary embodiment, a distributed system 200 adopts a peer-to-peer (P2P) network 210 in compliance with a REsource LOcation And Discovery (RELOAD) protocol standard. The distributed system 200 includes a RELOAD storage node 220 and RELOAD requesting nodes 230 (respectively labeled as 230-1, 230-2, . . . and 230-N), wherein N is a positive integer. It is to be mentioned that each storage node and each requesting node in the distributed system 200 may be an electronic device capable of processing communication under the RELOAD protocol, such as a computer, a notebook computer, a smart phone, a workstation or a server, but the disclosure is not limited thereto.

The RELOAD storage node (which is simplified as a storage node) 220 provides a storage space for storing a target data table 222 (as shown in FIG. 3). The target data table 222 includes an identifier field and a data content field. The identifier field is configured to record a type of an identifier of a requesting node so as to identify the requesting node. The data content field records data content corresponding to the type of the identifier. The target data table 222 will be described in detail with reference to FIG. 3 later.

Figure 2B:
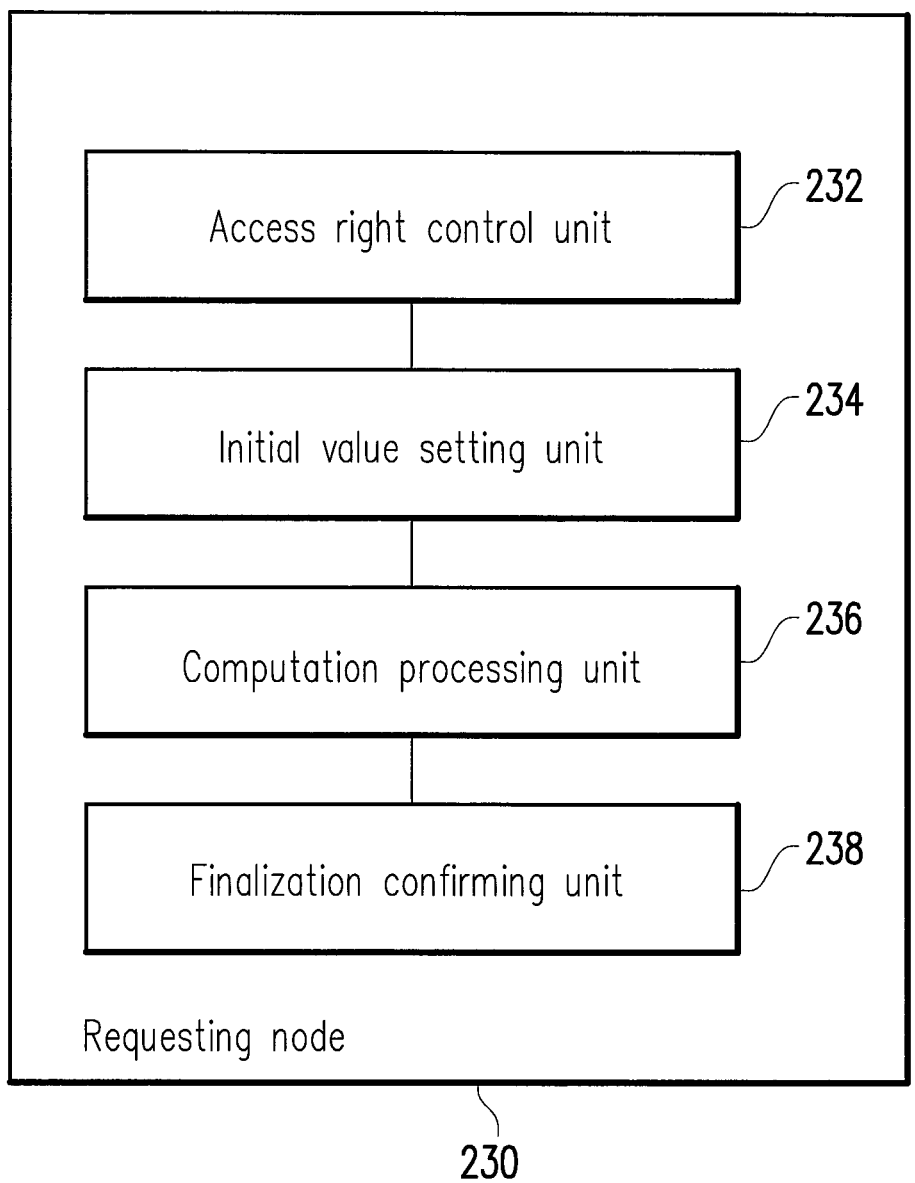
FIG. 2B is a block diagram illustrating a requesting node adopting the RELOAD protocol configuration according to an exemplary embodiment of the disclosure.

FIG. 2B is a block diagram illustrating a requesting node adopting the RELOAD protocol configuration according to an exemplary embodiment of the disclosure. A RELOAD requesting node (which is simplified as a requesting node hereinafter) 230 includes an access right control unit 232, an initial value setting unit 234, a computation processing unit 236 and a finalization confirming unit 238. The access right control unit 232, the initial value setting unit 234, the computation processing unit 236 and the finalization confirming unit 238 may be implemented in a software format, a hardware format or a combination thereof, which are not limited by the disclosure herein.

At first, the access right control unit 232 writes a register identifier and a register time of the requesting node 230 into the target data table 222. Then, the access right control unit 232 reads the target data table 222 to confirm whether an access right of writing into the storage node 220 is obtained. The access right control unit 232 determines whether there exists a register time record of any other requesting node between the latest result data completed in the target data table 222 and the register time record of the requesting node 230 in the target data table 222. The register time record of any other requesting node, for example, includes a register identifier and a register time of any other requesting node. If not, the access right control unit 232 determines that the requesting node 230 still has the access right. The initial value setting unit 234 reads and sets a computation initial value related to target data. The computation processing unit 236 performs a computation process according to the computation initial value and then, writes a usage identifier and a computation result of the requesting node 230 into the target data table 222. The finalization confirming unit 238 reads the target data table 222 to determine whether there exists a record related to any other requesting node between the records of the register time and the result data so as to confirm validity of the computation result.

Action records of requesting nodes corresponding to the same data may be stored in the same target data table while action records of requesting nodes corresponding to different data may be stored in different target data tables. FIG. 3 is a schematic diagram illustrating the target data table 222 according to an exemplary embodiment of the disclosure. Referring to FIG. 3, in the present exemplary embodiment, the target data table 222 corresponds to the same data X in the storage node 220. For example, the data X is a number of views of the related art. The target data table 222 includes an identifier field C1 and a data content field C2. In the present exemplary embodiment, given that the requesting node 230-1 which is going to write a computation result into a target data table 222 of the storage node 220. The identifier field C1 is configured to record a type of an identifier of the requesting node 230-1, and the data content field C2 is configured to record a content of the actual data corresponding to the identifier of the requesting node 230-1. For example, the requesting node 230-1 has two identifiers (IDs), a register identifier $U_t$ and a usage identifier $U_v$, respectively. Therein, the data content field C2 corresponding to the register identifier $U_t$ records a register time $T_u$ of the requesting node 230-1, while the data content field C2 corresponding to the usage identifier $U_v$ records a computation result $V_u$ related to the data X.

When the requesting nodes 230-1, 230-2, ... and 230-N are going to write the result data related to the same data X into the target data table 222 in the storage node 220, each of the requesting nodes is going to record the two records (the register time and the result data) as shown in FIG. 3 in the target data table 222 of the storage node 220. A current requesting node reads the target data table 222 and confirms whether the current requesting node itself has an access right of the storage node 220 according to an order of a register time record of each requesting node. After confirming that the current requesting node obtains the access right, the current requesting node reads and computes the data. Then the current requesting node writes the usage identifier and computation result into the target data table 222. Finally, whether there is any record of any other requesting node inserted between the register time and the result data in the target data table 222 is confirmed, such that validity of computation result related to the data X is confirmed. Thus, each requesting node may be aware which user is allowable for the data X in the storage node 220 by reading the target data table 222 so as to avoid a problem of race condition in the distributed system.

Figure 4:
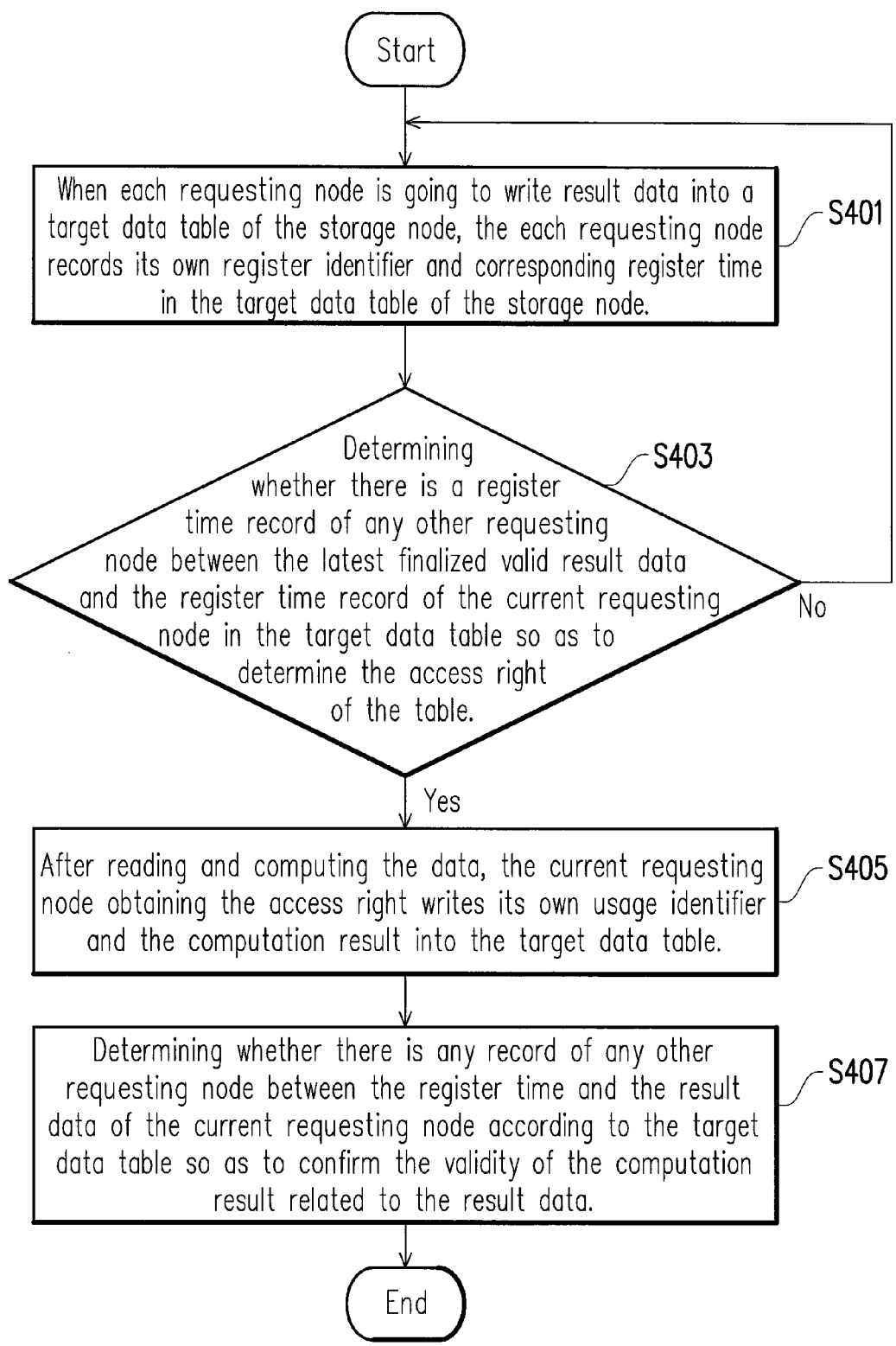
FIG. 4 is a flowchart illustrating a data storage method according to an exemplary embodiment of the disclosure.

FIG. 4 is a flowchart illustrating a data storage method according to an exemplary embodiment of the disclosure. Referring to FIG. 4, the method of the present exemplary embodiment is applicable to the distributed system 200 illustrated in FIG. 2 and the target data table 222 illustrated in FIG. 3. Each step of the data storage method of the present exemplary embodiment will be described with reference to FIG. 2 and FIG. 3 hereinafter.

In step S401, when each of the requesting nodes 230-1, 230-2, ... and 230-N is going to write the result data into the target data table 222 of the storage node 220, each of the requesting nodes records its own register identifier and corresponding register time in the target data table 222 of the storage node 220. In step S403, a current requesting node (any one of the requesting nodes 230-1, 230-2, ... and 230-N) reads the content of the target data table 222 to look for an order of the register time record of each of the requesting nodes to determine whether the current requesting node itself has the access right of the storage node 220. If one of the other requesting nodes has a register time earlier than the current requesting node but has a record later than the current requesting node, its register time record is retained and step S401 is returned to. If there is no register time record of any other requesting node between the latest finalized valid result data in the target data table and the register time record of the current requesting node, the current requesting node has the access right and step S405 is entered. After reading and computing the data, the current requesting node writes its own usage identifier and computation result in to the target data table 222. In step S407, the target data table 222 is read, and whether there is any record of any other requesting node between the register time and the result data of the current requesting node is determined according to the target data table 222 so as to judge the validity of the computation result related to the result data.

Figure 5:
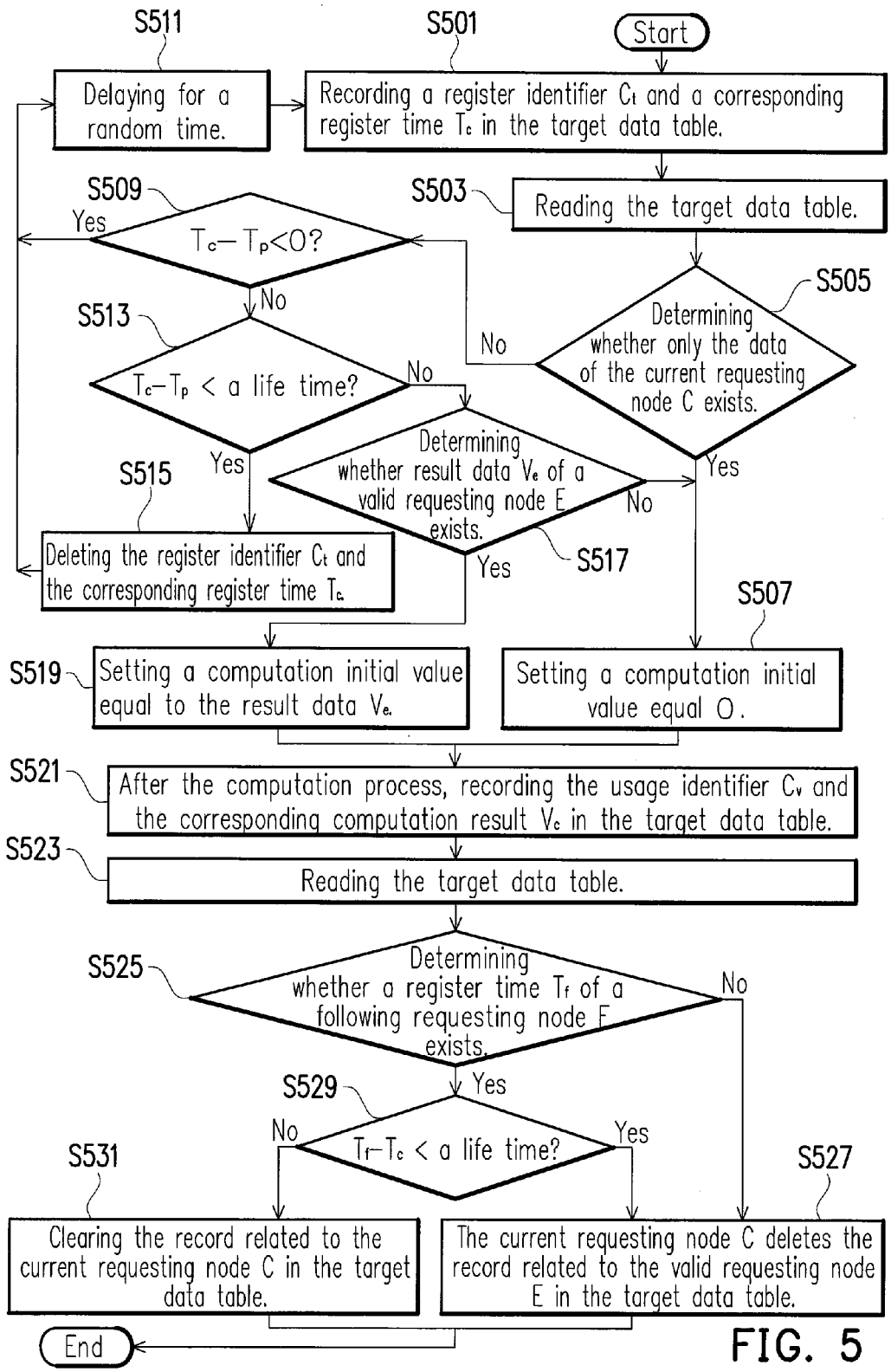
FIG. 5 is a flowchart illustrating a data storage method according to another exemplary embodiment of the disclosure.

FIG. 5 is a flowchart illustrating a data storage method according to another exemplary embodiment of the disclosure. The method of the present exemplary embodiment is also applicable to the distributed system 200 illustrated in FIG. 2, likewise.

Referring to FIG. 5, when a requesting node C is going to write result data into a target data table of the storage node, a register identifier $C_t$ and a register time $T_c$ of the current requesting node C is first recorded in the target data table of the storage node (step S501). Therein, the result data is a computation result related to the data X, for example. Then, the current requesting node C reads the target data table (step S503) and determines whether there is only the data of the current requesting node C in the target data table (step S505). If true, it represents that the current requesting node C has an access right of writing into the target data table in the storage node. Thus, the current requesting node C sets a computation initial value equal to 0 (step S507). Returning to step S505, if the determination result is false, it represents that there is another register data in the target data table, and thus, the current requesting node C is aware that there may be a register time record (a register identifier $P_t$ and a register time $T_p$) of a previous requesting node P in the target data table. Therein, the previous requesting node P represents a latest user prior to the current requesting node C, which is going to write into the target data table of the storage node. For example, the previous requesting node P is computing but not yet writing the result data. If there is no previous requesting node P, the register time $T_p$ may be set as 0 during the later computation process of the requesting node C.

In step S509, whether a time difference between the register time $T_c$ of the current requesting node C and the register time $T_p$ of the previous requesting node P is smaller than 0 is determined. If true, it represents that the register time $T_c$ of the current requesting node C is prior to the register time $T_p$ of the previous requesting node P but scheduled thereafter. Thus, the current requesting node C is not yet allowed to access the target data table but has a reservation right. The reservation right represents that after the previous requesting node P finishes accessing, the current requesting node C has the privilege to access the target data table, and the record of the register time of the requesting node C is not removed. As in step S511, after a random time delay, the current requesting node C updates again its own register time $T_c$.

In step S509, if the determination result is false, then step S513 is entered. The current requesting node C further determines whether the time difference between the register time $T_c$ of the current requesting node C and the register time $T_p$ of the previous requesting node P is smaller than a life time. The life time represents a maximum effective operation processing time of each requesting node upon the receipt of the access right. If the time difference between the register time $T_c$ of the current requesting node C and the register time $T_p$ of the previous requesting node P is smaller than the life time, it represents that the previous requesting node P is still within the effective operation processing time and thus, the current requesting node C is not yet capable of obtaining the access right and the current requesting node C deletes the record related to the register identifier $C_t$ and the corresponding register time $T_c$ stored by itself in the target data table (step S515). After a random time delay, the current requesting node C records the register identifier $C_t$ thereof again and updates the register time $T_c$ thereof.

On the contrary, if the determination result of step S513 is false, it represents that the previous requesting node P is already expired (i.e. exceeds the effective processing time), and thus, the previous requesting node P automatically loses the access right thereof. As a result, the current requesting node C obtains the access right and looks for result data $V_e$ of a valid requesting node E in the target data table (step S517). Said valid requesting node E represents the requesting node having an order that is the latest to the current requesting node C in the target data table and a data pair of a register time $T_e$ and a result data $V_e$ that is completely recorded. In the present exemplary embodiment, the data pair of the register time $T_e$ and the result data $V_e$ includes a register identifier $E_t$, a register time $T_e$, a usage identifier $E_v$, and result data $V_e$. If the determination result of step S517 is true, the current requesting node C sets the computation initial value equal to the result data $V_e$ of the requesting node E (step S519). If the determination result of step S517 is true, step S507 is entered.

Thereafter, the current requesting node C performs the computation process according to the computation initial value and then records the usage identifier $C_v$ and the corresponding computation result $V_c$ in the target data table (step S521). After the computation result is written, the current requesting node C reads the target data table again (step S523). The current requesting node C examines whether there is a register time record (a register identifier $F_t$ and a register time $T_f$) of a following requesting node F during its computation process (step S525). The following requesting node F in the present exemplary embodiment represents a new competitor appears during the process of the current requesting node C obtaining the access right and performing the computation process (i.e. before the computation result is written). If the register time $T_f$ (i.e. a following register time) of the following requesting node F does not exist, it represents that the computation result of the current requesting node C has the validity. The current requesting node C deletes the register time $T_e$ and the result data $V_e$ of the valid requesting node E in the target data table (step S527). On the contrary, if the register time $T_f$ of the following requesting node F exists, the current requesting node C determines whether a time difference between the register time $T_f$ of the following requesting node F and the register time $T_c$ of the current requesting node C is smaller than the life time (step S529). If true, the current requesting node C is still within the effective process time, and thus, the computation result thereof has the validity. If false, the current requesting node C is already expired (i.e. exceeds the effective processing time) and thus, automatically loses the access right. Therefore, step S531 is entered and the record related to the current requesting node C in the target data table is cleared.

Figure 6:
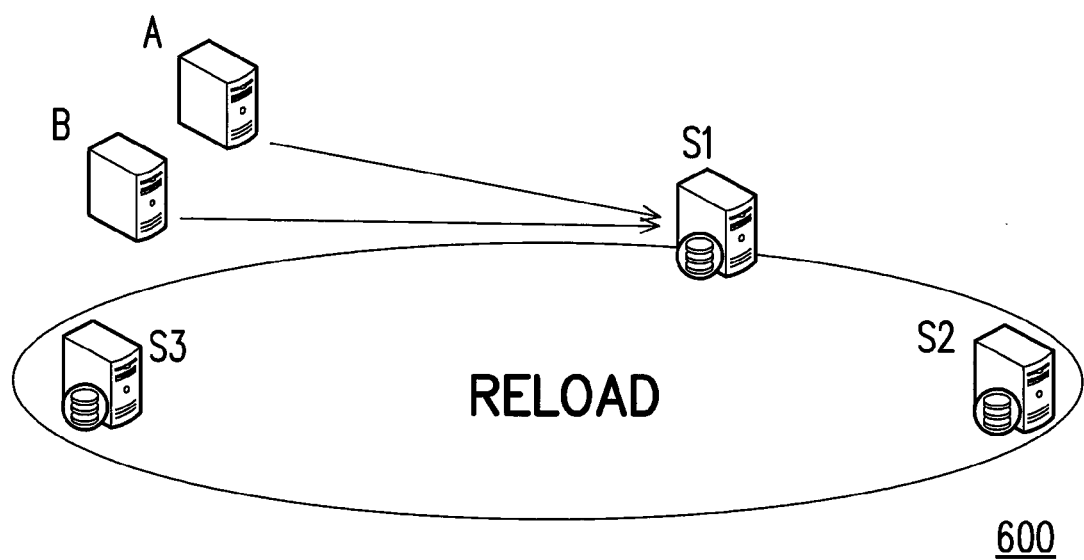
FIG. 6 is a schematic diagram illustrating a scenario where the data storage system is applied according to another exemplary embodiment of the disclosure.

In order to make the disclosure more comprehensive, several application scenarios are illustrated for description. FIG. 6 is a schematic diagram illustrating an application scenario of the data storage system according to another exemplary embodiment of the disclosure. Referring to FIG. 6, a distributed system 600 includes two requesting nodes A and B and storage nodes S1, S2 and S3. A plurality of time flowcharts is utilized to describe operational scenarios of the requesting nodes A and B accessing a target data table in the storage node S1 and here, the target data table corresponds to the same data X.

Figure 7:
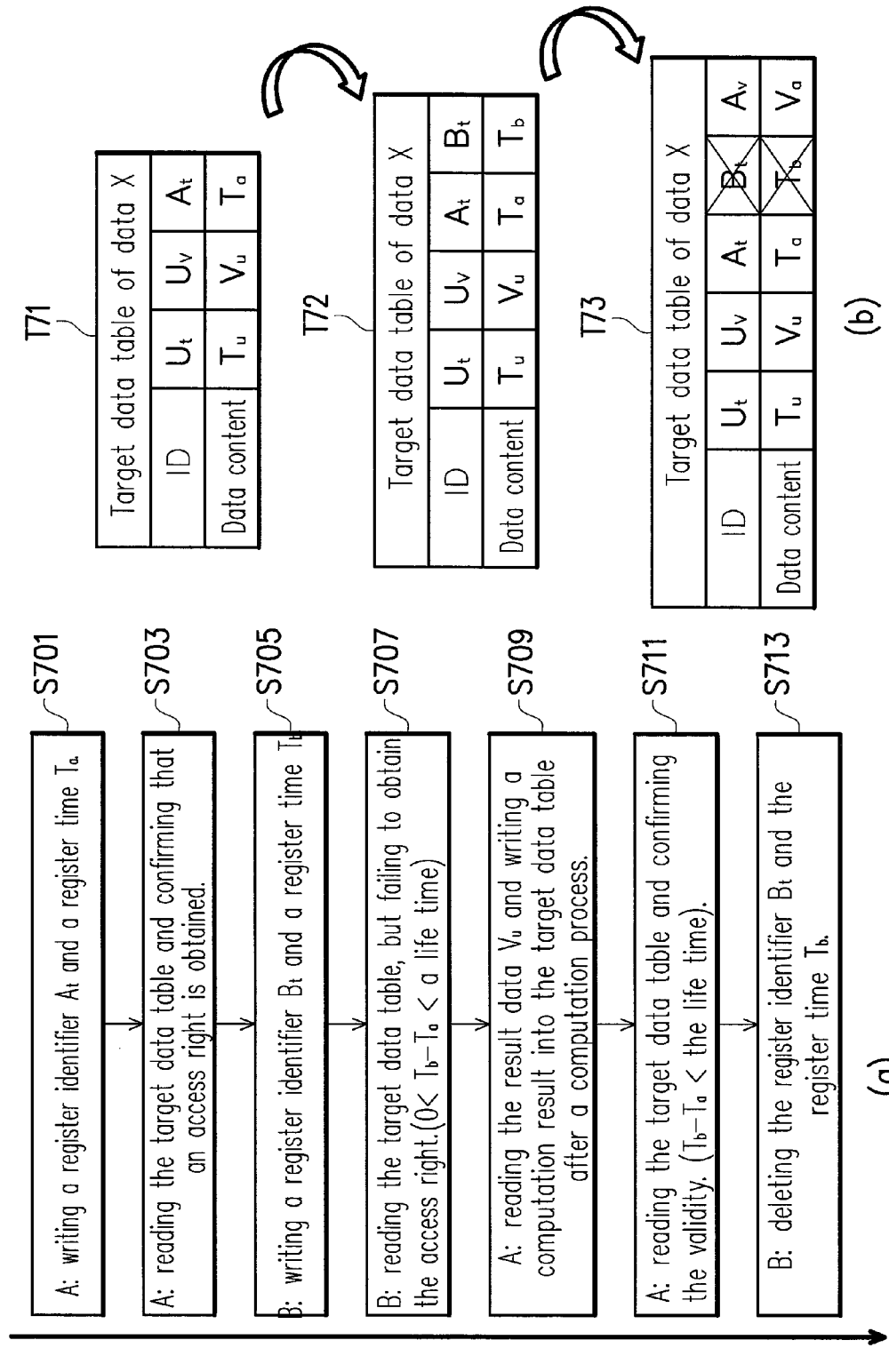
FIG. 7(a) is a time flowchart illustrating a first operation type of the data storage method according to another exemplary embodiment of the disclosure.
FIG. 7(b) is a schematic diagram illustrating a target data table of a storage node corresponding to the time flowchart of the first operation type of the data storage method.

FIG. 7(a) is a time flowchart illustrating a first operation type of the data storage method according to another exemplary embodiment of the disclosure. FIG. 7(b) is a schematic diagram illustrating a target data table of a storage node corresponding to the time flowchart of the first operation type of the data storage method. The present exemplary embodiment will be described with reference to FIG. 6, FIG. 7(a) and FIG. 7(b).

First, in step S701 of FIG. 7(a), when the requesting node A is going to write result data into a target data table of the storage node S1, the requesting node A writes a register identifier $A_t$ and a register time $T_a$ into a target data table T71. Then, in step S703, the requesting node A reads the target data table T71 and determines an access right to write into the target data table of the storage node S1 according to the target data table T71. The requesting node A is aware that there is a complete data pair of a register time $T_u$ and a result data $V_u$ in the target data table T71. And posterior to the record related to the data pair in the target data table T71, there is no other requesting node registering prior to the requesting node A. Thus, the requesting node A has the access right to write into the target data table. In step S705, the requesting node B is going to write result data into the target data table of the storage node S1 and writes a register identifier $B_t$ and a register time $T_b$ into the target data table. In step S707, the requesting node B reads an updated target data table T72. In the present exemplary embodiment, if a time difference between the register time $T_b$ of the requesting node B and a register time $T_a$ of the requesting node A is between 0 and a life time, it represents that the requesting node A is still within the effective processing time and retains the access right. Thus, the requesting node B fails to obtain the access right. In step S709, the requesting node A reads the result data $V_u$, sets a computation initial value equal to the result data $V_u$, performs a computation process, and writes a computation result into the target data table. In step S711, the requesting node A reads an updated target data table T73. Since the time difference between the register time $T_b$ and the register time $T_a$ is between 0 and the life time, result data $V_a$ is valid. It is to be mentioned that upon the confirmation that the computation result has the validity, the requesting node A clears the record related to the data pair of the register time $T_u$ and the result data $V_u$ in the target data table T73. Finally, in step S713, since the requesting node B fails to obtain the access right, the requesting node B automatically deletes the register identifier $B_t$ and the register time $T_b$ in the target data table T73.

Figure 8:
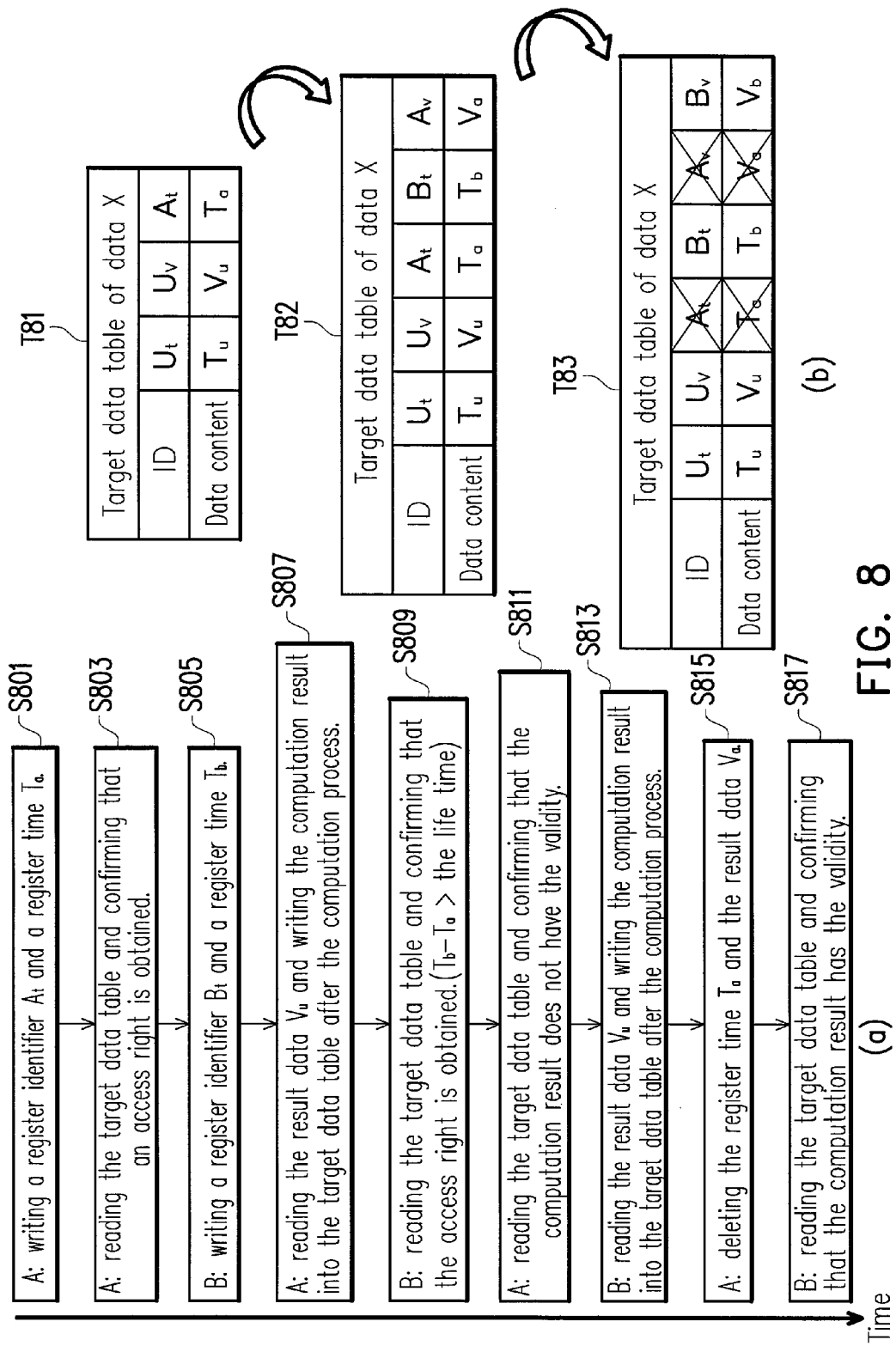
FIG. 8(a) is a time flowchart illustrating a second operation type of the data storage method according to another exemplary embodiment of the disclosure.
FIG. 8(b) is a schematic diagram illustrating a target data table of a storage node corresponding to the time flowchart of the second operation type of the data storage method.

FIG. 8(a) is a time flowchart illustrating a second operation type of the data storage method according to another exemplary embodiment of the disclosure. FIG. 8(b) is a schematic diagram illustrating a target data table of a storage node corresponding to the time flowchart of the second operation type of the data storage method. The present exemplary embodiment will be described with reference to FIG. 6, FIG. 8(a) and FIG. 8(b).

First, in step S801 of FIG. 8(a), when the requesting node A is going to write the result data into the target data table of the storage node S1, the requesting node A writes the register identifier $A_t$ and the register time $T_a$ into a target data table T81. Then, in step S803, the requesting node A reads the target data table T81 and determines whether an access right to write into the target data table of the storage node S1 is obtained accordingly. The requesting node A is aware that there is a complete data pair of a register time $T_u$ and a result data $V_u$ in the target data table T81 according to the target data table T81. And posterior to the record related to the data pair in the target data table T81, there is no other requesting node registering prior to the requesting node A. Thus, the requesting node A has the access right to write into the target data table. In step S805, the requesting node B is going to write the result data into the target data table of the storage node S1. The requesting node B writes the register identifier $B_t$ and the register time $T_b$ into the target data table. In step S807, the requesting node A reads the result data $V_u$, sets the computation initial value equal to the result data $V_u$, performs the computation process, and writes the computation result into the target data table. In step S809, the requesting node B reads an updated target data table T82. In the present exemplary embodiment, a time difference between the register time $T_b$ and the register time $T_a$ is greater than the life time, which represents that the requesting node A exceeds the effective processing time and loses the access right. Accordingly, the requesting node B obtains the access right to write into the target data table. In step S811, the requesting node A reads the updated target data table T82. Since the register time $T_b$ of the requesting node B is between the register time $T_a$ and the result data $V_a$, in the present exemplary embodiment, the requesting node B is a "following requesting node" for the requesting node A. The requesting node A confirms that the time difference between the register time $T_b$ and the register time $T_a$ is larger than the life time, such that the computation result does not have the validity. In step S813, the requesting node B reads the result data $V_u$, sets the computation initial value equal to the result data $V_u$, performs the computation process, and writes the computed result data $V_b$ into the target data table. In step S815, since the computation result of the requesting node A does not have the validity, the requesting node A deletes the register identifier $A_t$, the register time $T_a$, a usage identifier $A_t$ and the result data $V_a$ in the target data table T83. Finally, in step S817, the requesting node B reads the updated target data table T83. Since there is no other new competitor between the register time $T_b$ and the computation result $V_b$, it is confirmed that the computation result has the validity. Meanwhile, the requesting node B clears the data pair of the register time $T_u$ and the result data $V_u$ recorded in the target data table T83.

Figure 9:
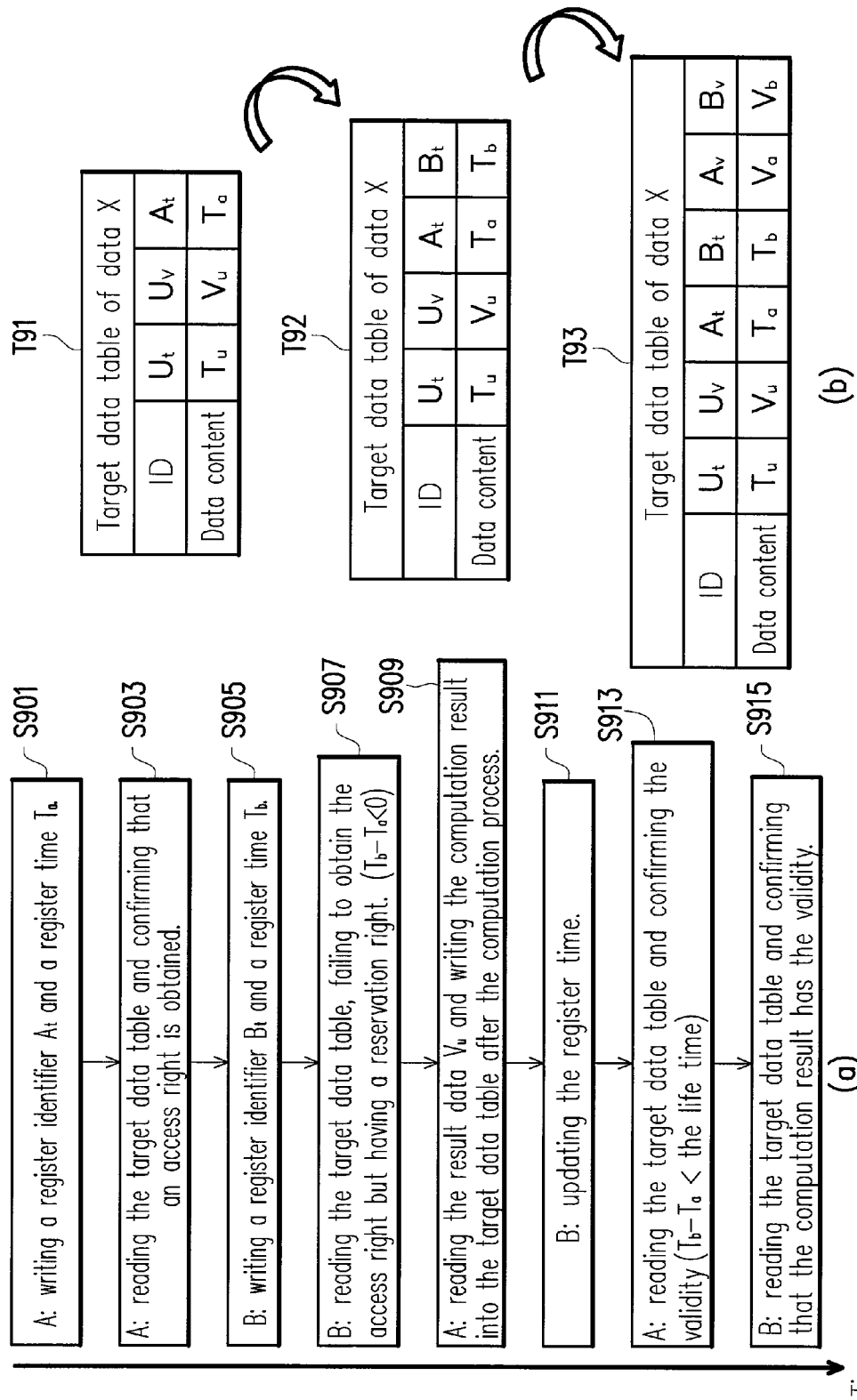
FIG. 9(a) is a time flowchart illustrating a third operation type of the data storage method according to another exemplary embodiment of the disclosure.
FIG. 9(b) is a schematic diagram illustrating a target data table of a storage node corresponding to the time flowchart of the third operation type of the data storage method.

FIG. 9(*a*) is a time flowchart illustrating a third operation type of the data storage method according to another exemplary embodiment of the disclosure. FIG. 9(*b*) is a schematic diagram illustrating a target data table of a storage node corresponding to the time flowchart of the third operation type of the data storage method. The present exemplary embodiment will be described with reference to FIG. 6, FIG. 8(*a*) and FIG. 8(*b*).

First, in step S901 of FIG. 9(*a*), when the requesting node A is going to write the result data into the target data table of the storage node S1, the requesting node A writes the register identifier $A_t$ and the register time $T_a$ into a target data table T91. Then, in step S903, the requesting node A reads the target data table T91 and determines whether an access right to write into the target data table of the storage node S1 is obtained accordingly. The requesting node A is aware that there is a complete data pair of a register time $T_u$ and a result data $V_u$ in the target data table T91. And posterior to the record related to the data pair in the target data table T81, there is no other requesting node registering prior to the requesting node A. Thus, the requesting node A has the access right to write into the target data table. In step S905, when the requesting node B is going to write the result data into the target data table of the storage node S1, the requesting node B writes the register identifier $B_t$ and the register time $T_b$ into the target data table. In step S907, the requesting node B reads an updated target data table T92. In the present exemplary embodiment, if a time difference between the register time $T_b$ of the requesting node B and a register time $T_a$ of the requesting node A is smaller than 0, the requesting node B obtains the reservation right.

It is to be mentioned that if there are a plurality of requesting nodes competing for the access right of the target data table of the storage node, the order of the register time record of each of the requesting nodes in the target table may be different with the order of the time that each of the requesting nodes sends the command to write the register time. The write commands of the requesting nodes may be delayed a period of time before reaching the storage node due to different data transmission paths or other reasons. As such, in the present exemplary embodiment, the register time of the requesting node B is prior to the register time of the requesting node A, but the register time record of the requesting node B is scheduled posterior to the register time record of the requesting node A. Namely, under the situation where the time difference between the register time $T_b$ and the register time $T_a$ is smaller than 0, the requesting node B fails to obtain the access right but has the reservation right.

Then, in step S909, the requesting node A reads the result data $V_u$, sets the computation initial value equal to the result data $V_u$, performs the computation process, and writes the computation result into the target data table. In step S911, after a random time delay, the requesting node B updates the register time $T_b$ to avoid being expired. However, since the register time record of the requesting node B is not removed, the requesting node B or any other requesting node in the distributed system may be aware that the requesting node B has the reservation right by way of reading the target data table. In step S913, the requesting node A reads an updated target data table T93. As for the requesting node A, the requesting node B is the following requesting node; however, since the time difference between the register time $T_b$ and the register time $T_a$ is smaller than the life time, the requesting node A confirms its own computation result of the result data $V_a$ has the validity and clear the data pair of the register time $T_u$ and the result data $V_u$ recorded in the target data table T93. In step S915, the requesting node B reads the updated target data table T93. Since the requesting node B waits and obtains the access right until the requesting node A finish accessing, as for the requesting node B, the latest complete data pair of the register time and the result data is the data pair of the register time $T_a$ and the result data $V_a$ of the requesting node A. The requesting node B reads the result data $V_a$, sets the computation initial value equal to the result data $V_a$, and writes the computed result data $V_b$ into the target data table. The requesting node B reads the target data table T93 to determine that there is no other competitor between the register time $T_b$ and the result data $V_b$, and therefore, confirms that the computation result of the result data $V_b$ has the validity. Finally, the requesting node B clears the data pair of the register time $T_a$ and the result data $V_a$ recorded in the target data table T93.

Based on the above, by the data storage method of the disclosure and the distributed system and the requesting node adopting the method, the identifier and the corresponding data content of a requesting node are recorded in the target data table of the storage node, such that the requesting node may confirm whether itself is a allowable user by a method of first writing and then examining. The operation of the disclosure does not need a centralized coordinator nor change the operational mechanism of the storage node, and thus, a process of communication or message exchange is not required among the requesting nodes.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A data storage method, applicable to a requesting node which is an electronic device for processing communication under a resource location and discovery (RELOAD) protocol, the method comprising:
    writing, by the requesting node, a register time record of the requesting node to a target data table on a storage node, wherein the target data table stores a shared data which is editable to the requesting node, and the register time record comprises a register identifier of the requesting node and a register time being a timing point at which the requesting node registers on the storage node;
    determining, by the requesting node, whether the requesting node has an access right to write into the storage node by reading the target data table to look for a previous register time record, the requesting node determines that a time difference between the register time of the register time record and a previous register time of the previous register time record is not smaller than 0 and is not smaller than a life time, such that the requesting node determines to has the access right, wherein the life time is a maximum effective operation processing time of the requesting node upon receiving the access right;
    computing a result data by the requesting node obtaining the access right, wherein the result data is related to the shared data on the storage node;
    writing, by the requesting node, a usage identifier and the result data into the target data table; and
    reading, by the requesting node, the target data table to judge validity of the result data.

2. The method according to claim 1, wherein the step of reading the target data table to determine whether the access right to write into the storage node is obtained comprises:
    reading the target data table by the requesting node, wherein the target data table contains at least one data pair comprising another register identifier, another register time, another usage identifier and another result data.

3. The method according to claim 2, where n the step of reading the target data table to determine whether the access right to write into the storage node is obtained further comprises:
    if the previous register time record of a previous requesting node which previously registers does not exist posterior to the data pair, the access right is obtained by the requesting node.

4. The method according to claim 2, wherein the step of reading the target data table to determine whether the access right to write into the storage node is obtained further comprises:
    if the previous register time record of a previous requesting node which previously registers exists posterior to the data pair, determining whether a time difference between the register time and a previous register time is not smaller than a life time, and if true, the requesting node obtains the access right, wherein the previous register time record comprises a previous register identifier and the previous register time.

5. The method according to claim 4, further comprising:
    if the time difference between the register time and the previous register time is smaller than 0, the requesting node updates the register time after a random time delay.

6. The method according to claim 5, wherein the register identifier and the register time of the requesting node is retained in the target data table.

7. The method according to claim 4, further comprising:
    if the time difference between the register time and the previous register time is between 0 and the life time, the requesting node clears the register identifier and the register time.

8. The method according to claim 7, wherein after the step of clearing the register identifier and the register time by the requesting node, the method further comprises:
    recording the register identifier and an updated register time in the target data table by the requesting node after a random time delay.

9. The method according to claim 1, wherein the step of reading the target data table to determine whether the access right to write into the storage node is obtained comprises:
    reading the target data table by the requesting node, wherein if the target data table only contains the register identifier and the register time, the requesting node obtains the access right.

10. The method according to claim 1, wherein the step of computing the result data by the requesting node which obtains the access right comprises:
    computing the result data by the requesting node according to a computation initial value, wherein the computation initial value is 0.

11. The method according to claim 1, wherein the step of computing the result data by the requesting node which obtains the access right comprises:
    computing the result data by the requesting node according to a computation initial value, wherein the computation initial value is another result data of a data pair, an order of the data pair is the latest to the requesting node, and the data pair comprises another register identifier, another register time, another usage identifier and the another result data.

12. The method according to claim 1, wherein the step of reading the target data table to judge the validity of the result data comprises:
    reading the target data table and determining whether a following register time of a following requesting node exists between the register time and the result data.

13. The method according to claim 12, wherein if the following register time exists in the target data table, and the time difference between the following register time and the register time is smaller than a life time, the result data is valid.

14. The method according to claim 12, wherein if the following register time exists in the target data table, and the time difference between the following register time and the register time is not smaller than a life time, the result data is not valid.

15. The method according to claim 14, wherein when the result data is not valid, the method further comprises:
    clearing records related to the requesting node in the target data table.

16. The method according to claim 2, after the step of reading the target data table to judge the validity of the result data comprises:
clearing the data pair.

17. The method according to claim 1, wherein the target data table is in the storage node in a distributed system and the requesting node is applicable to the distributed system.

18. A data storage system, comprising:
at least one storage node, storing a target data table; and
at least one requesting node, each of the at least one requesting node writing a register time record of the at least one requesting node into the target data table on the at least one storage node, wherein the target data table stores a shared data which is editable to the at least one requesting node, and the register time record comprises a register identifier of the at least one requesting node and a register time being a timing point at which the at least one requesting node registers on the at least one storage node, wherein the at least one requesting node is an electronic device for processing communication under a resource location and discovery (RELOAD) protocol,
wherein a current requesting node among the at least one requesting node determines whether the current requesting node has an access right to write into the at least one storage node by reading the target data table to look for a previous register time record, the current requesting node determines that a time difference between the register time of the register time record and a previous register time of the previous register time record is not smaller than 0 and is not smaller than a life time, such that the current requesting node determines to has the access right, wherein the life time is a maximum effective operation processing time of the each of the at least one requesting node upon receiving the access right, the current requesting node obtaining the access right computes a result data, writes a usage identifier and the result data into the target data table and reads the target data table to judge validity of the result data, wherein the result data is related to the shared data on the at least one storage node.

19. The data storage system according to claim 18, wherein the current requesting node comprises:
an access right control unit, reading the target data table, wherein the target data table contains at least one data pair, and the at least one data pair comprises another register identifier, another register time, another usage identifier and another result data.

20. The data storage system according to claim 19, wherein
if the access right control unit determines that the previous register time record of a previous requesting node which previously registers does not exist posterior to the data pair, the access right is obtained by the requesting node.

21. The data storage system according to claim 19, wherein
if the previous register time record of a previous requesting node which previously registers exists in the target data table, the access right control unit determines whether a time difference between the register time and a previous register time is not smaller than a life time, and if true, the access right is obtained by the requesting node, wherein the previous register time record comprises a previous register identifier and the previous register time.

22. The data storage system according to claim 21, wherein
if the access right control unit determines that the time difference between the register time and the previous register time is smaller than 0, the access right control unit of the current requesting node updates the register time after a random time delay.

23. The data storage system according to claim 22, wherein the register identifier and the register time of the requesting node is retained in the target data table.

24. The data storage system according to claim 21, wherein
if the access right control unit determines that the time difference between the register time and the previous register time is between 0 and the life time, the current requesting node clears the register identifier and the register time.

25. The data storage system according to claim 24, wherein
the access right control unit further records the register identifier and an updated register time in the target data table after a random time delay.

26. The data storage system according to claim 19, wherein the current requesting node comprises:
an initial value setting unit, coupled to the access right control unit, looking for the data pair, wherein an order of the data pair is the latest to the current requesting node and the initial value setting unit sets a computation initial value equal to the another result data of the data pair.

27. The data storage system according to claim 26, wherein the current requesting node comprises:
a computation processing unit, coupled to the initial value setting unit, receiving the computation initial value set by the initial value setting unit, and after performing a computation process, the computation processing unit writes the usage identifier and the result data into the target data table.

28. The data storage system according to claim 18, wherein the current requesting node comprises:
an initial value setting unit, setting a computation initial value equal to 0 when the target data table only has the register identifier and the register time.

29. The data storage system according to claim 18, wherein the current requesting node comprises:
a finalization confirming unit, reading the target data table and determining whether a following register time of a following requesting node exists between the register time and the result data and if the following register time does not exist, confirming that the result data is valid.

30. The data storage system according to claim 29, wherein
if the following register time exists in the target data table, and the finalization confirming unit determines that the time difference between the register time and the following register time is smaller than a life time, the result data is valid.

31. The data storage system according to claim 29, wherein
if the finalization confirming unit determines that the time difference between the register time and the following register time is not smaller than a life time, the result data is not valid.

32. The data storage system according to claim 29, wherein when the result data is not valid, the finalization confirming unit clears records related to the current requesting node in the target data table.

33. The data storage system according to claim 18, wherein
the target data table of the storage node has at least one or more columns, one of the columns records the register identifier and the usage identifier of each of the requesting nodes, and another one of the columns records each corresponding register time and each corresponding result data.

34. The data storage system according to claim 18, wherein
the storage node comprises records related to each of the requesting nodes corresponding to first data in a first target data table and comprises records related to each of the requesting nodes corresponding to second data in a second target data table.

35. The data storage system according to claim 18, wherein the data storage system is in a distributed system adopting a peer-to-peer based (P2P-based) REsource LOcation And Discovery (RELOAD) protocol standard.

36. A requesting node, which is an electronic device for processing communication under a resource location and discovery (RELOAD) protocol, applicable to a data storage system, the requesting node comprising:
an access right control unit, writing a register time record of the requesting node into a target data table on a storage node and determining whether the requesting node has an access right to write into the storage node by reading the target data table to look for a previous register time record,
wherein the target data table stores a shared data which is editable to the requesting node, and the register time record comprises a register identifier of the requesting node and a register time being a timing point at which the requesting node registers on the storage node, and
wherein the requesting node determines that a time difference between the register time of the register time record and a previous register time of the previous register time record is not smaller than 0 and is not smaller than a life time, such that the requesting node determines to has the access right, wherein the life time is a maximum effective operation processing time of the requesting node upon receiving the access right;
a computation processing unit, computing a result data when the access right control unit determines that the access right is obtained and writing a usage identifier and the result data into the target data table, wherein the result data is related to the shared data on the storage node; and
a finalization confirming unit, reading the target data table to judge validity of the result data.

37. The requesting node according to claim 36, wherein the access right control unit reads the target data table, the target data table contains at least one data pair comprising another register identifier, another register time, another usage identifier and another result data.

38. The requesting node according to claim 37, wherein if the access right control unit determines that the previous register time record of a previous requesting node which previously registers does not exist posterior to the data pair, the access right is obtained by the requesting node.

39. The requesting node according to claim 37, wherein if the previous register time record of a previous requesting node which previously registers exists in the target data table, the access right control unit determines whether a time difference between the register time and a previous register time is not smaller than a life time, and if true, the access right is obtained, wherein the previous register time record comprises a previous register identifier and the previous register time.

40. The requesting node according to claim 39, wherein if the access right control unit determines that the time difference between the register time and the previous register time is smaller than 0, the access right control unit updates the register time after a random time delay.

41. The requesting node according to claim 40, wherein the register identifier and the register time of the requesting node is retained in the target data table.

42. The requesting node according to claim 39, wherein if the access right control unit determines that the time difference between the register time and the previous register time is between 0 and the life time, the access right control unit clears the register identifier and the register time.

43. The requesting node according to claim 42, wherein the access right control unit further records the register identifier and an updated register time in the target data table after a random time delay.

44. The requesting node according to claim 37, further comprising:
an initial value setting unit, coupled to the access right control unit, looking for the data pair, wherein an order of the data pair is the latest to the requesting node and the initial value setting unit sets a computation initial value equal to the another result data of the data pair, which is provided to the computation processing unit to compute the result data.

45. The requesting node according to claim 36, further comprising:
an initial value setting unit, setting a computation initial value equal to 0 when the target data table only has the register identifier and the register time.

46. The requesting node according to claim 36, wherein the finalization confirming unit reads the target data table and determines whether a following register time of a following requesting node exists between the register time and the result data and if the following register time does not exist, the result data is valid.

47. The requesting node according to claim 46, wherein if the following register time exists in the target data table, and the finalization confirming unit determines that the time difference between the register time and the following register time is smaller than a life time, the result data is valid.

48. The requesting node according to claim 46, wherein if the finalization confirming unit determines that the time difference between the register time and the following register time is not smaller than a life time, the result data is not valid.

49. The requesting node according to claim 46, wherein when the result data is not valid, the finalization confirming unit clears records related to the requesting node in the target data table.

50. The requesting node according to claim 36, wherein the requesting node is further applicable to a distributed system adopting a Peer-to-Peer based (P2P-based) REsource LOcation And Discovery (RELOAD) protocol standard.

* * * * *